(12) United States Patent
Kirkland et al.

(10) Patent No.: US 7,937,268 B2
(45) Date of Patent: *May 3, 2011

(54) FACILITATING NAVIGATION OF VOICE DATA

(75) Inventors: Dustin Kirkland, Austin, TX (US); David Bruce Kumhyr, Austin, TX (US)

(73) Assignee: Nuance Communications, Inc., Burlington, MA (US)

(*) Notice: Subject to any disclaimer, the term of this patent is extended or adjusted under 35 U.S.C. 154(b) by 221 days.

This patent is subject to a terminal disclaimer.

(21) Appl. No.: 12/267,572

(22) Filed: Nov. 8, 2008

(65) Prior Publication Data

US 2009/0070676 A1    Mar. 12, 2009

Related U.S. Application Data

(63) Continuation of application No. 10/793,463, filed on Mar. 4, 2004, now Pat. No. 7,478,044.

(51) Int. Cl.
*G10L 15/26* (2006.01)
(52) U.S. Cl. ........................ 704/235; 704/270
(58) Field of Classification Search .............. 704/235, 704/251, 270
See application file for complete search history.

(56) References Cited

U.S. PATENT DOCUMENTS

| 5,615,296 | A | 3/1997 | Stanford et al. |
|---|---|---|---|
| 5,848,130 | A | 12/1998 | Rochkind |
| 6,278,772 | B1 | 8/2001 | Bowater et al. |
| 6,567,506 | B1 | 5/2003 | Kermani |
| 6,570,964 | B1 | 5/2003 | Murveit et al. |
| 6,697,796 | B2 | 2/2004 | Kermani |
| 6,785,367 | B2 | 8/2004 | Horvath et al. |
| 7,039,585 | B2 | 5/2006 | Wilmot et al. |
| 7,092,496 | B1 | 8/2006 | Maes et al. |
| 2002/0147592 | A1 | 10/2002 | Wilmot et al. |

*Primary Examiner* — Angela A Armstrong
(74) *Attorney, Agent, or Firm* — Wolf, Greenfield & Sacks, P.C.

(57) ABSTRACT

A system, system, and program for facilitating navigation of voice data are provided. Tokens are added to voice data based on predefined content criteria. Then, bidirectional scanning of the voice data to a next token within the voice data is enabled, such that navigation to pertinent locations within the voice data during playback is facilitated. When adding tokens to voice data, the voice data may be scanned to detect pauses, changes in voice inflection, and other vocal characteristics. Based on the detected vocal characteristics, tokens identifying ends of sentences, separations between words, and other structures are marked. In addition, when adding tokens to voice data, the voice data may be first converted to text. The text is then scanned for keywords, phrases, and types of information. Tokens are added in the voice data at locations identified within the text as meeting the predefined content criteria.

9 Claims, 4 Drawing Sheets

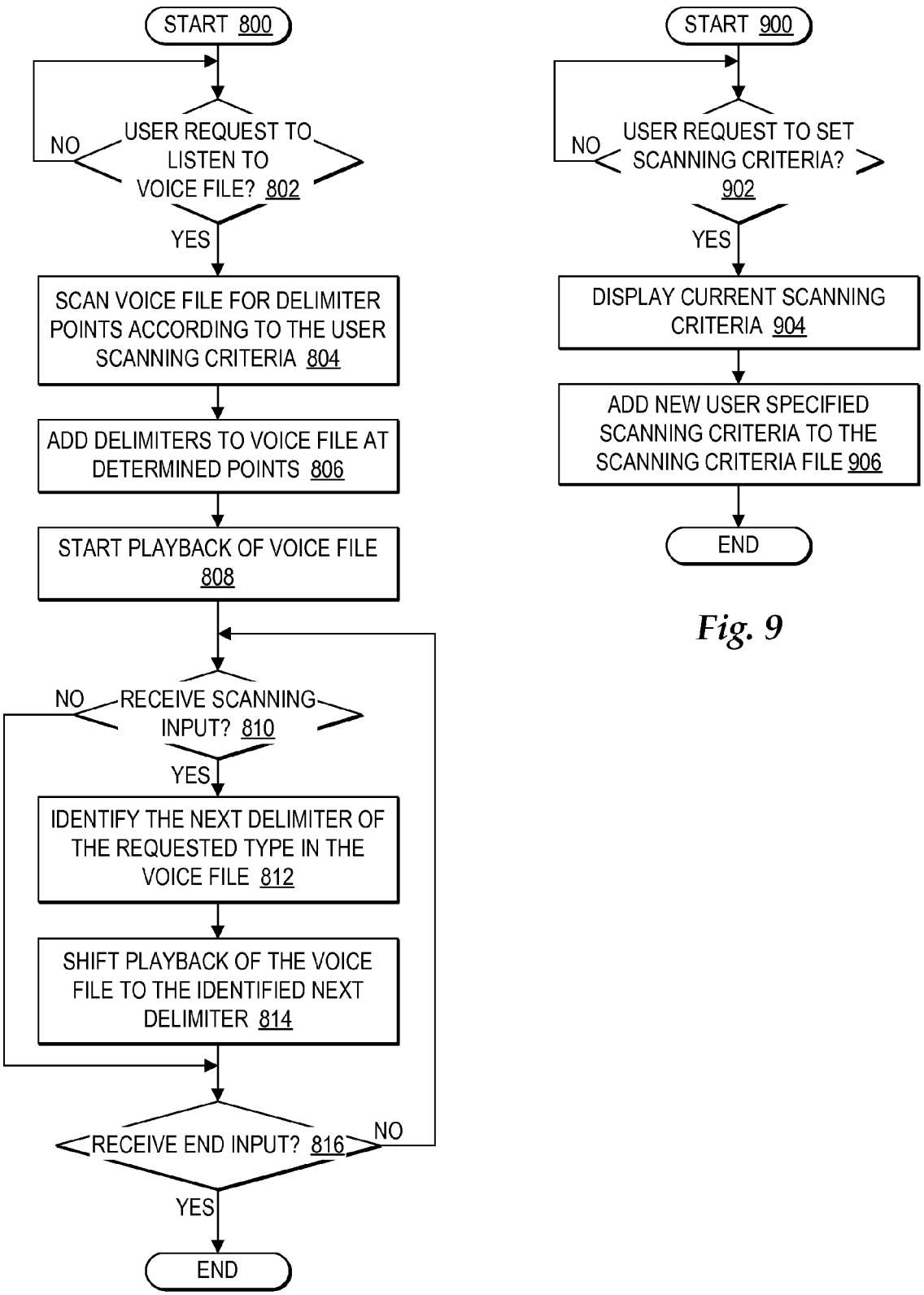

FACILITATING NAVIGATION OF VOICE DATA

CROSS-REFERENCE TO RELATED APPLICATIONS

This application is a continuation of commonly assigned U.S. patent application Ser. No. 10/793,463, filed Mar. 4, 2004, which is hereby incorporated herein by reference.

BACKGROUND OF THE INVENTION

1. Technical Field

The present invention relates in general to improved voice data management and in particular to improved navigation of voice data. Still more particularly, the present invention relates to tokenizing voice data to facilitate user navigation among the tokenized points within the voice data.

2. Description of the Related Art

The use of voice messaging and recording continues to proliferate in an age of automated call answering services and digital voice recording. For example, when a person places a call, that person is often redirected to a voice messaging service and instructed to leave a voice message. The intended recipient later accesses and listens to the voice message. In another example, conference calls may be recorded as a sound file that can then be distributed across a network or stored for reference.

Furthering the proliferation of voice messaging and recording are voice recognition systems that convert voice into text. Voice data files may be converted into text so that the smaller text document can be stored instead of the larger voice data file. In addition, once voice data is converted into text, the text is often more easily searchable for keywords or phrases.

With voice data, one of the issues that often arises is how to most efficiently control playback of the voice data. A voice message, for example, may contain a contact telephone number that the recipient needs, but that telephone number is positioned in the middle of a two minute voice message. If the listener is not able to write down the telephone number when listening to the voice message the first time, it is not advantageous for the listener to have to listen to the entire message again just to hear the telephone number again.

One method of controlling playback of messages allows a listener to request that the message jump forward three seconds, or some other fixed period of time. While allowing a listener to jump through a message does reduce the portion of the voice message a listener has to review, this method still requires that the listener locate the desired information within the message and does not provide for the listener to move back to a previous position in the message. As an alternative to requiring a listener to listen for a particular piece of information, another method exists for converting a voice message to text, locating a particular keyword or phrase within the text, and outputting just that keyword or phrase to the user. While it may be advantageous for a listener to just receive a particular piece of information from the message, like a telephone number, this method ignores the value of listening to a keyword or phrase in the context of the voice message. For example, after a speaker leaves a phone number, the speaker may further specify not to return the call after a particular hour; this type of context is lost when only the phone number is extracted from a voice message.

In view of the foregoing, it would be advantageous to provide a method, system, and program for facilitating listener navigation through voice data to quickly reach pertinent points of the voice data and to enabling listening to the context surrounding pertinent information. In particular, it would be advantageous to provide a method, system, and program for marking pertinent points within voice data and allowing a listener to jump forwards and backwards between the marked points while listening to the voice data.

SUMMARY OF THE INVENTION

Therefore, the present invention provides improved navigation of voice data. Still more particularly, the present invention provides a method, system, and program for tokenizing voice data to facilitate user navigation among the tokenized points within the voice data.

According to one embodiment, tokens are added to voice data based on predefined content criteria. Then, bidirectional scanning of the voice data to a next token within the voice data is enabled, such that navigation to pertinent content locations within the voice data during playback is facilitated.

When adding tokens to voice data, the voice data may be scanned to detect pauses, changes in voice inflection, and other vocal characteristics. Based on the detected vocal characteristics, tokens identifying the predefined content criteria, such as ends of sentences, separations between words, and other structures, are marked.

In addition, when adding tokens to voice data, the voice data may be first converted to text. The text is then scanned for keywords, phrases, and types of information matching predefined content criteria. Tokens are added in the voice data at locations identified within the text as meeting the predefined content criteria.

In one embodiment, tokens are textual delimiters that identify the type of criteria being marked. Alternatively, tokens may be other types of data added to voice data to mark pertinent locations.

To control bidirectional scanning, users may enter scanning inputs that identify whether to scan forwards or backwards within voice data. Further, users may identify the type of token to jump to when multiple types of criteria are marked within voice data.

Voice data may include, but is not limited to, voice files, voice messages, and voice recordings. Voice data may be received via a network, from a digital recording device, or other recording system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 depicts a high level logic flowchart of a process and program for tokenizing and controlling playback of voice based files in accordance with the method, system, and program of the present invention; and FIG. 9 depicts a high level logic flowchart of a process and program for facilitating user input of scanning criteria in accordance with the method, system, and program of the present invention.

DETAILED DESCRIPTION OF THE PREFERRED EMBODIMENT

Figure 1:
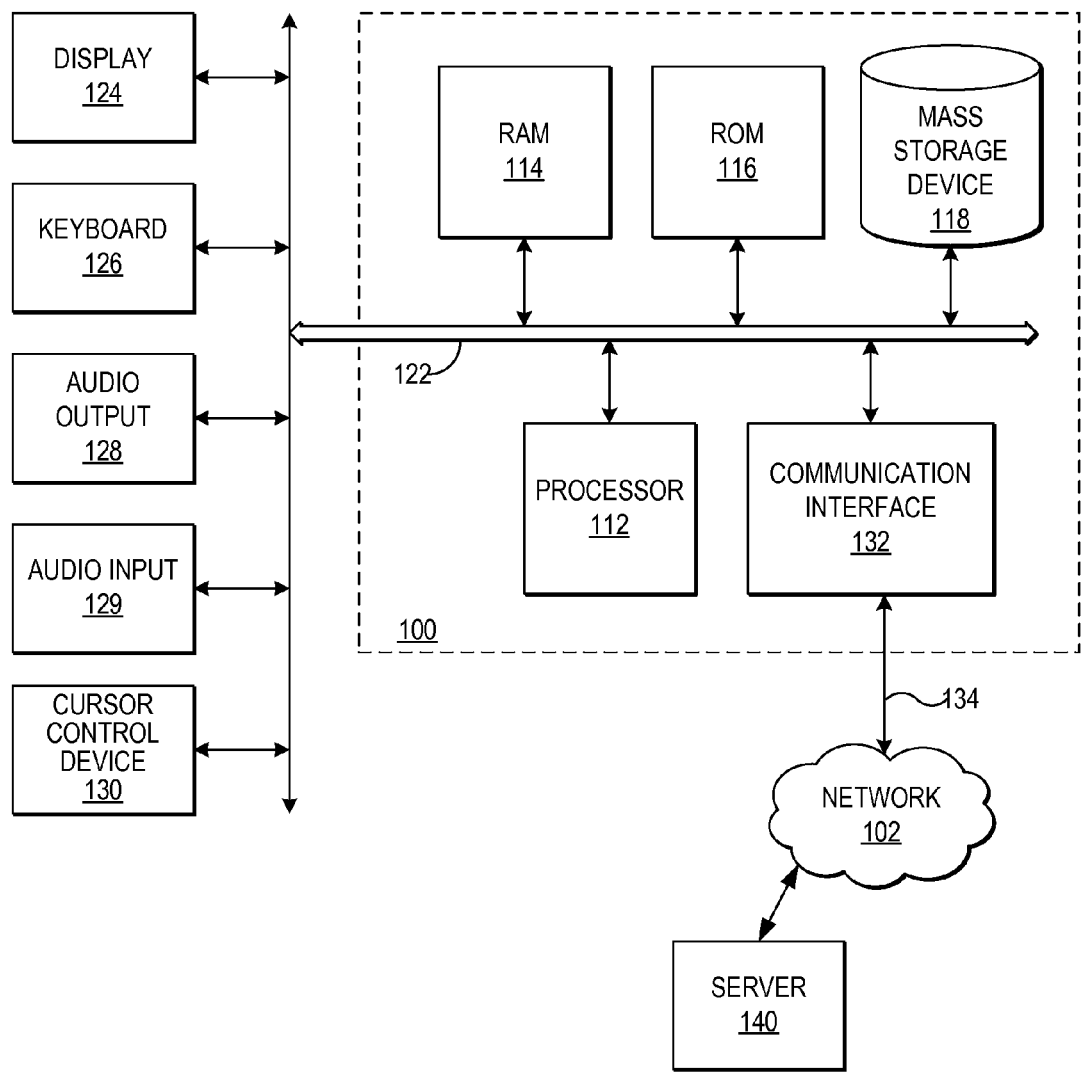
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowcharts of FIGS. 8, 9, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Furthermore, network 102 may include the public switched telephone network (PSTN) and wireless telephone networks. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
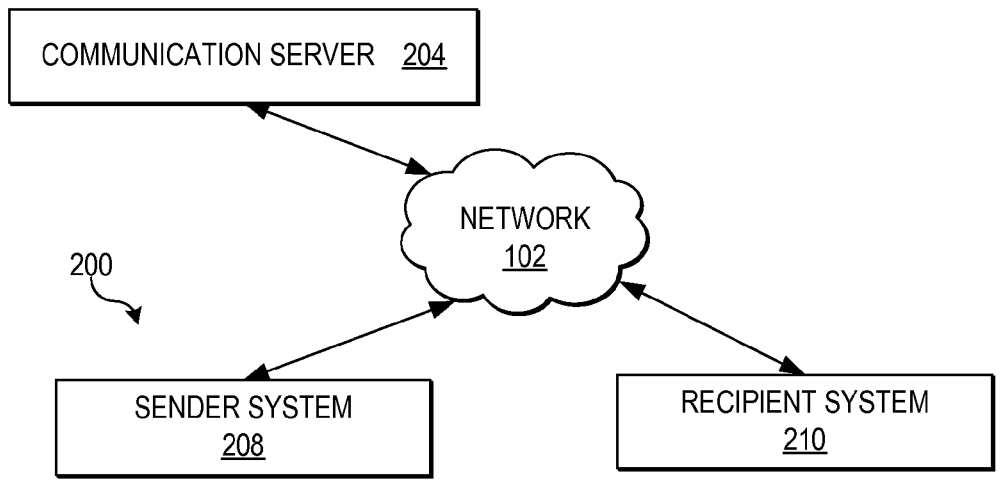
FIG. 2 is a block diagram depicting a distributed network system for facilitating distribution of voice data between a sender and a recipient.

With reference now to FIG. 2, a block diagram depicts a distributed network system for facilitating distribution of voice data between a sender and a recipient. Distributed data processing system 200 is a network of computers in one embodiment of the invention may be implemented. It will be understood that the present invention may be implemented in other embodiments of systems enabled to communicate via a connection.

In the embodiment, distributed data processing system 200 contains network 102, which is the medium used to provide communications links between various devices and computers connected together within distributed data processing system 200. Network 102 may include permanent connections such as wire or fiber optics cables, temporary connections made through telephone connections and wireless transmission connections. Network 102 may include the public switched telephone network (PSTN) and other telephone networks. Further, network 102 may incorporate the Internet and other protocol based networks.

In one example, sender system 208 and recipient system 210 communicate via the PSTN portion of network 102, however communication server 204 provides a voice messaging system. The user at sender system 208 leaves a voice message for the recipient of recipient system 210. The recipient at recipient system 210 later accesses communication server 204 to access the voice message. Alternatively, the voice messaging system may be incorporated within recipient system 210.

In another example, the client/server architecture of distributed data processing system 200 is implemented within an Internet architecture where network 102 represents a worldwide collection of networks and gateways that use the TCP/IP suite of protocols to communicate with one another. Communication server 204 facilitates electronic messaging and communication systems through which sender system 208 and recipient system 210 communicate through messaging applications. Messaging applications may facilitate text, voice, and video communications. For example, a sender may attach a voice file onto an electronic mail communication that is received at recipient system 210 via communication server 204.

Figure 3:
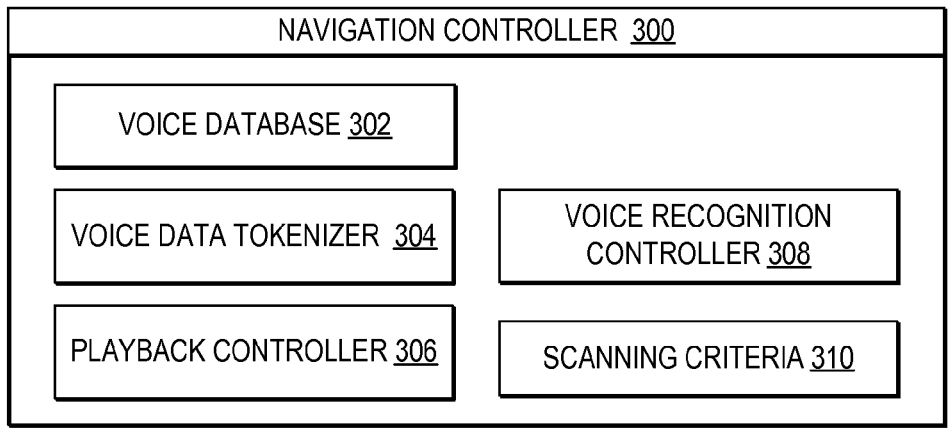
FIG. 3 depicts a communication controller for controlling tokenizing voice data and facilitating navigation during playback of voice data.

Referring now to FIG. 3, there is depicted a block diagram of a communication controller for controlling the tokenizing of voice data and facilitating navigation during playback of voice data. As depicted, a navigation controller 300 includes a voice data database 302 for organizing storage of voice data. Referring back to FIG. 2, navigation controller 300 may be implemented at sender system 208, recipient system 210, communication server 204, or by another system accessible via network 102. Further, navigation controller 300 may be implemented within a stand-alone system not connected to a network.

Voice database 302 may include voice data received via a network, from a voice messaging system, from a digital voice recorder, or from another other source. For purposes of description, voice data may include voice recordings, voice messages, voice files, and any other data that includes a voice based component. Further, voice data may include the text that has been converted from a voice file.

Scanning criteria 310 includes predefined content criteria set by a user or others designating the types of voice characteristics that should be tokenized within voice data. Voice data tokenizer 304 scans voice data for points that meet the scanning criteria and sets delimiters at these points within the voice data. For example, if scanning criteria 310 designates tokenizing sentences, voice data tokenizer 304 may scan for pauses in speech that indicate breaks in sentences or changes in vocal inflection or emphasis that indicate separations between words. In another example, if scanning criteria 310 designates tokenizing particular words or phrases, voice recognition controller 308 may be called by voice data tokenizer 304 to convert voice data into text so that the text can be scanned according to the textual criteria. Voice data tokenizer 304 then adds delimiters to the voice data to indicate word boundaries, sentence boundaries, keywords, numbers, and other predefined content criteria searched for within the converted text.

The delimiters set by voice data tokenizer 304 are preferably textual indicators that are detected by playback controller 306. For example, a delimiter may be a bracketed number, such as "[A]" within the voice data, where "[A]" indicates the break between a sentence. It will be understood that in addition to textual indicators, other types of delimiters may be added to tokenize voice data.

When requested, playback controller 306 controls playback of the voice data. If a user selects to scan between delimiters, playback controller 306 detects user scanning inputs and starts play of the voice data from the next selected delimiter. Advantageously, the user may select to move forward or backward to delimiters within the voice data. Further, the user may select the type of delimiter to move to within the voice data when multiple types of predefined content criteria are marked.

Figure 4:
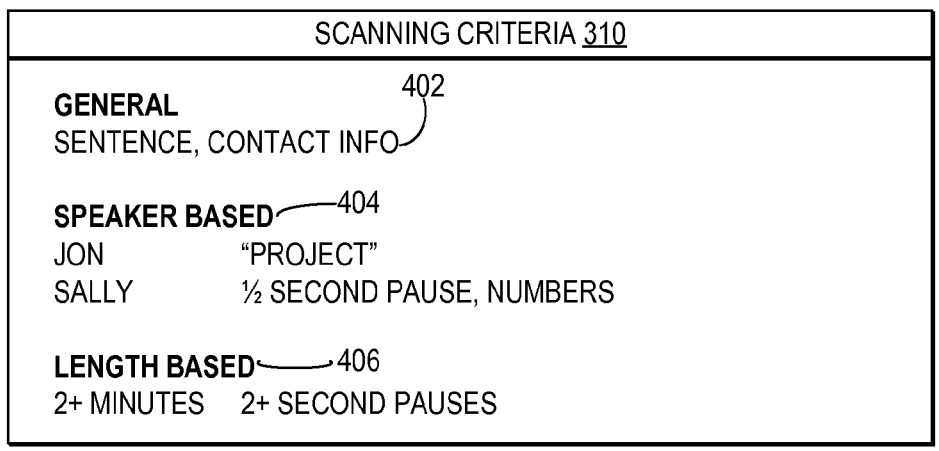
FIG. 4 depicts an illustrative representation of scanning criteria in accordance with the method, system, and program of the present invention.

With reference now to FIG. 4, there is depicted an illustrative representation of scanning criteria in accordance with the method, system, and program of the present invention. As depicted, scanning criteria 310 includes predefined content criteria further delineated as general criteria 402, speaker based criteria 404, and length based criteria 406.

In the example, general criteria 402 includes content criteria for setting delimiters for each spoken sentence and for contact information. When the voice data tokenizer applies general criteria 402, the voice data tokenizer would detect pauses in speech of a particular length as indicating a sentence break. Further, the voice data tokenizer may convert the voice data to text and look for contact information such as a name, a phone number, an address, an electronic mail (e-mail) address, and other identification.

In addition, in the example, speaker based criteria 404 includes criteria for two speakers. In the example, if the voice data is from "jon" then delimiters should be set for the use of the word "project" within the voice data. In another example, if the voice data is from "sally" then delimiters should be set when a half second pause or numbers are detected.

Further, in the example, length based criteria 406 includes criteria for setting delimiters when voice data is of particular lengths. In the example, if a particular voice message, recording, or file is longer than two minutes, then delimiters should be set for each pause detected that is two seconds or longer. Although not depicted, in another example, where a message is longer than twenty seconds, then delimiters might be set for any spoken numbers detected in the message.

It is important to note that while scanning criteria 310 may include speaker based criteria 404 that is identity based and length based criteria 406 that is time based, scanning criteria 310 is primarily focused on marking delimiters based on predefined content criteria where the content includes structure (e.g. sentences, words, phrases) and types of information (e.g. keywords, numbers). Identity and time characteristics of the voice data are additional criteria for determining which predetermined content criteria to apply.

Figure 5:
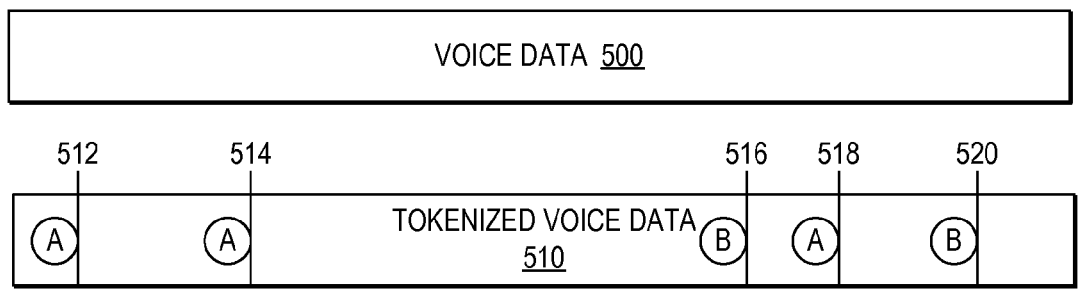
FIG. 5 depicts an illustrative representation of tokenized voice data in accordance with the method, system, and program of the present invention.

Referring now to FIG. 5, there is depicted an illustrative representation of tokenized voice data in accordance with the method, system, and program of the present invention. As depicted, voice data 500 is a voice recording, message, or file of a particular length. According to an advantage of the invention, voice data 500 is scanned according to user scanning criteria and marked with delimiters to indicate locations within the voice data that meet the user scanning criteria. As one example, tokenized voice data 510 depicts voice data 500 after delimiters are added. In the example, delimiters 512, 514, and 518 are added to indicate where the voice data meets criteria "A". Delimitters 516 and 520 are added to indicate where the voice data meets criteria "B".

According to an advantage of the invention, while the user listens to tokenized voice data 510, the user may request to advance to the next delimiter of a particular type or return to the previous delimiter of a particular type. For example, when the voice data starting at delimiter 514 begins to play, the user may request to advance to delimiter 518 or return to delimiter 514. Further, in the example, the user may request to advance to delimiter 516 which represents the start of voice data meeting criteria "B".

Figure 6:
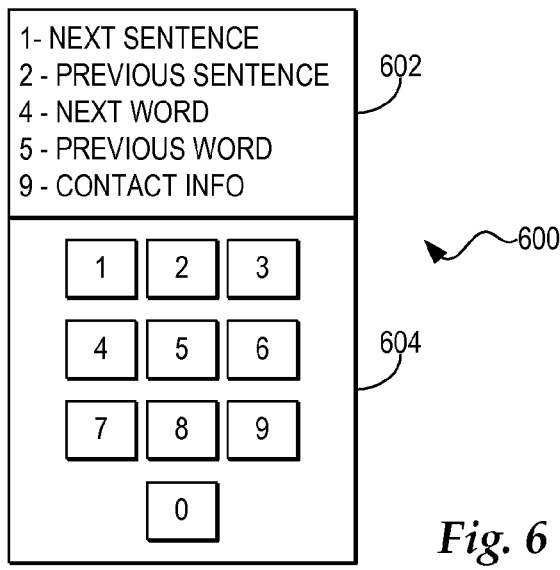
FIG. 6 depicts an illustrative representation of a keypad interface at which a user may request to scan through voice data according to particular criteria.

With reference now to FIG. 6, there is depicted an illustrative representation of a keypad interface at which a user may request to scan through voice data according to particular criteria. In the example, a display interface 602 depicts a table of functions to aid a user in entering scanning selections. A keypad 604 provides an input interface for a user to enter scanning selections by depressing one of the number keys. As depicted in display interface 602, if a user selects "1" in keypad 604, then the user is indicating a selection to jump forwards to the next sentence delimiter. Alternatively, a user may select "2" in keypad 604 to indicate a select to jump backwards to the previous sentence delimiter. Other inputs may indicate a select to jump forwards to the next word, backwards to the previous word, or to the next contact information. It is important to note that keypad 604 is just one example of an input interface through which a user may enter scanning selections. Other input interfaces may include, but are not limited to, a graphical interface, a microphone, a keyboard, and other known input interfaces.

Figure 7:
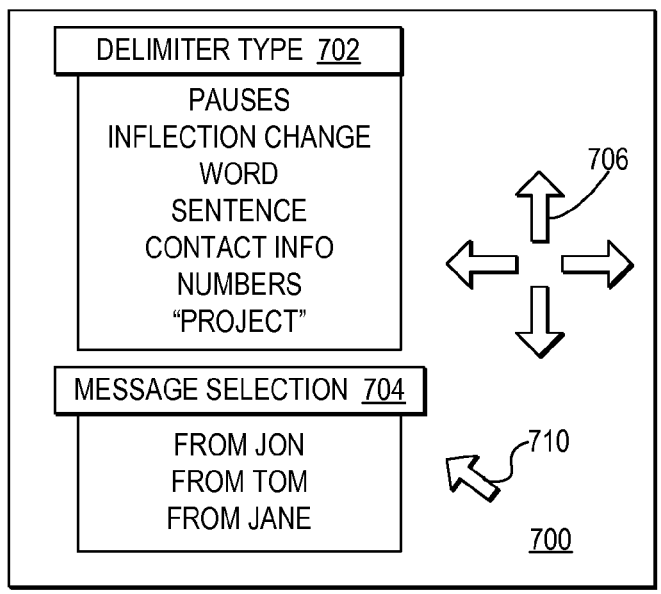
FIG. 7 depicts illustrative representation of a graphical user interface at which a user may request to scan through voice data according to particular criteria.

Referring now to FIG. 7, there is depicted an illustrative representation of a graphical user interface at which a user may request to scan through voice data according to particular criteria. As depicted, by positing cursor 710 within display interface 700, a user may select from among the selectable areas within display interface 700. First, a user may select a delimiter type from within delimiter type menu 702. As illustrated, delimiter type menu 702 is a drop down menu from which a user may select the type of delimiter to jump to within the voice data. Next, a user may select which message or messages to scan in message selection menu 704. Finally, by selecting the left and right arrows of selectable movers 706, a user may select to move forward or backward within a message or messages to a point designated by a selected delimiter type. Further, a user may select the up and down arrows of selectable movers 706 to move from one type of delimiter to another or to move from one message to another. While in the present embodiment selectable movers 706 are depicted as part of the graphical user interface, in an alternate embodiment, selectable movers 706 may be part of a keypad interface where a user applies physical pressure to each of the arrows.

With reference now to FIG. 8, there is depicted a high level logic flowchart of a process and program for tokenizing and controlling playback of voice based files in accordance with the method, system, and program of the present invention. As illustrated, the process starts at block 800 and thereafter proceeds to block 802. Block 802 depicts a determination whether a user requests to listen to a voice file. If a user does not request to listen to a voice file, then the process iterates at block 802. If a user requests to listen to a voice file, then the process passes to block 804. Block 804 depicts scanning the voice file for delimiter points according to the user scanning criteria. Scanning the voice file according to the user scanning criteria may further require converting the voice file into text. Additionally, if a user requests to listen to multiple voice files, then each file may be scanned according to the user scanning criteria. Next, block 806 depicts adding delimiters to the voice file at the determined points, and the process passes to block 808. By adding delimiters that indicate a position meeting the scanning criteria set by the user and may identify type of scanning criteria met, the voice file is tokenized. It is important to note that the process depicted at block 804 and 806 may also be performed when a voice file is received or stored or while the user listens to the voice file.

Block 808 depicts starting playback of the voice file. Next, block 810 depicts a determination whether a scanning input is received from the user. If a scanning input is received from the user, then the process passes to block 812. Block 812 depicts identifying the next delimiter of the requested type in the voice file. Next, block 814 depicts shifting playback of the voice file from the location of the identified next delimiter, and the process passes to block 816.

Returning to block 810, if a scanning input is not received from the user, then the process passes to block 816. Block 816 depicts a determination whether an end play input is received from the user. If an end play input is not received from the user, then the next voice file may begin play or the process returns to block 810. If an end play input is received from the user, then the process ends.

Referring now to FIG. 9, there is depicted a high level logic flowchart of a process and program for facilitating user input of scanning criteria in accordance with the method, system, and program of the present invention. As depicted, the process starts at block 900 and thereafter proceeds to block 902. Block 902 depicts a determination whether the user requests to set scanning criteria. If the user does not request to set scanning criteria, then the process iterates at block 902. Once the user requests to set scanning criteria, then the process passes to block 904. Block 904 depicts displaying the current scanning criteria for the user. Next, block 906 depicts adding the new user specified criteria to the scanning criteria for that user, and the process ends. In particular, a user may specify scanning criteria for different categories of voice files.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:
   at least one memory that stores processor-executable instructions for facilitating navigation of voice data; and
   at least one hardware processor, coupled to the at least one memory, that executes the processor-executable instructions to:
   scan voice data to detect a plurality of points each meeting one of a plurality of delimiter types within predefined content criteria;
   add at least one token to said voice data at each of said plurality of points; and
   display a graphical user interface comprising a selectable listing of said plurality of delimiter types for a user to select a particular delimiter to search for within said voice data, and a plurality of selectable movers through which a user selects to move forward and backward to a selection of said plurality of points specifying said particular delimiter during playback of said voice data and through which said user selects to move up and down said selectable listing of said plurality of delimiter types to select said particular delimiter.

2. The system according to claim 1, wherein the at least one hardware processor executes the processor-executable instructions to identifying each of said plurality of delimiter types of said predefined content criteria in each said at least one token.

3. The system according to claim 1, wherein the at least one hardware processor executes the processor-executable instructions to scan said text for at least one point meeting said plurality of delimiter types of said predefined content criteria, and add said at least one token at a location within said voice data matching said at least one point in said text.

4. The system according to claim 1, wherein the at least one hardware processor executes the processor-executable instructions to add said at least one token to said voice data based on said predefined content criteria, wherein each of said plurality of delimiters types comprises at least one delimiter type selected from the group consisting of a sentence, a word, a keyword, a phrase, and a type of information.

5. The system according to claim 1, wherein the at least one hardware processor executes the processor-executable instructions to receive said voice data from a particular speaker from among a plurality of speakers via a network and scan said voice data to identify said plurality of points each meeting one of a plurality of delimiter types specified for said particular speaker.

6. A computer program product for facilitating navigation of voice data, said computer program product residing on a tangible machine-readable medium having stored thereon machine executable instructions which when executed on a computer system cause the computer system to:
   scan voice data to detect a plurality of points each meeting one of a plurality of delimiter types within predefined content criteria;
   add at least one token to said voice data at each of said plurality of points;
   display a graphical user interface comprising a selectable listing of said plurality of delimiter types for a user to select a particular delimiter to search for within said voice data, and a plurality of selectable movers through which a user selects to move forward and backward to a selection of said plurality of points specifying said particular delimiter during playback of said voice data and through which said user selects to move up and down said selectable listing of said plurality of delimiter types to select said particular delimiter.

7. The computer program product according to claim wherein the tangible computer-readable program when executed on the computer system further causes the computer system to identify each of said plurality of delimiter types of said predefined content criteria in each said at least one token.

8. The computer program product according to claim 6, wherein the tangible computer-readable program when executed on the computer system further causes the computer system to:
   convert said voice data into text;
   scan said text for at least one point meeting one of said plurality of delimiter types of said predefined content criteria; and
   add said at least one token at a location within said voice data matching said at least one point in said text.

9. The computer program product according to claim 6, wherein the tangible computer-readable program when executed on the computer system further causes the computer system to:
   add said at least one token to said voice data based on said predefined content criteria, wherein each of said plurality of delimiters types is at least one type selected from the group consisting of: a sentence, a word, a keyword, a phrase, and a type of information.

\* \* \* \* \*

UNITED STATES PATENT AND TRADEMARK OFFICE
CERTIFICATE OF CORRECTION

| | | |
|---|---|---|
| PATENT NO. | : 7,937,268 B2 | Page 1 of 1 |
| APPLICATION NO. | : 12/267572 | |
| DATED | : May 3, 2011 | |
| INVENTOR(S) | : Dustin Kirkland et al. | |

It is certified that error appears in the above-identified patent and that said Letters Patent is hereby corrected as shown below:

In the Claims:

At column 9, claim 2, line 10, please change "identifying" to -- identify --;

At column 9, claim 4, line 23, please change "delimeters" to -- delimeter --;

At column 10, claim 7, line 13, please change "claim" to -- claim 6 --;

At column 10, claim 9, line 34, please change "delimeters" to -- delimeter --.

Signed and Sealed this
Fourteenth Day of June, 2011

David J. Kappos
*Director of the United States Patent and Trademark Office*